United States Patent [19]

Silverman

[11] Patent Number: 4,866,012

[45] Date of Patent: Sep. 12, 1989

[54] CARBOTHERMALLY REDUCED CERAMIC MATERIALS AND METHOD OF MAKING SAME

[75] Inventor: Lance D. Silverman, New York, N.Y.

[73] Assignee: Engelhard Corporation, Menlo Park, N.J.

[21] Appl. No.: 153,293

[22] Filed: Feb. 3, 1988

Related U.S. Application Data

[63] Continuation-in-part of Ser. No. 105,145, Oct. 5, 1987, abandoned.

[51] Int. Cl.$^4$ ...................... C04B 35/52; C04B 35/56; C04B 35/58
[52] U.S. Cl. .......................... 501/90; 501/96; 501/153; 423/409; 423/412; 423/439; 423/440
[58] Field of Search ............. 501/90, 96, 153; 423/409, 412, 439, 440

[56] References Cited

U.S. PATENT DOCUMENTS

| | | | |
|---|---|---|---|
| 1,107,011 | 8/1914 | Allen . | |
| 2,929,126 | 3/1960 | Bollack et al. | 25/157 |
| 2,984,576 | 5/1961 | Alexander et al. | 105/55 |
| 3,140,190 | 7/1964 | Di Lazzaro | 106/56 |
| 3,262,761 | 7/1966 | Bechtold | 29/182.5 |
| 3,427,373 | 2/1969 | Matsuo et al. | 264/60 |
| 3,903,230 | 9/1975 | Kamigaito et al. | 264/122 |
| 4,126,652 | 11/1978 | Oohara et al. | 423/440 X |
| 4,233,077 | 11/1980 | Hazel | 106/43 |
| 4,460,697 | 7/1984 | Hara et al. | 501/87 |
| 4,571,315 | 2/1986 | Gerontopoulos et al. | 264/0.5 |
| 4,571,414 | 2/1986 | Renlund et al. | 524/322 |
| 4,574,003 | 3/1986 | Gerk | 51/309 |
| 4,585,500 | 4/1986 | Minjolle et al. | 156/89 |
| 4,595,545 | 6/1986 | Sane | 264/65 |
| 4,615,863 | 10/1986 | Inoue et al. | 419/23 |
| 4,618,592 | 10/1986 | Kuramoto et al. | 264/66 |
| 4,622,215 | 11/1986 | Janey | 423/440 |
| 4,643,859 | 2/1987 | Mitomo et al. | 264/65 |
| 4,652,436 | 3/1987 | Kato | 423/406 |
| 4,710,368 | 12/1987 | Ritsko et al. | 423/406 X |
| 4,724,131 | 2/1988 | Hashimoto et al. | 423/406 X |

Primary Examiner—William R. Dixon, Jr.
Assistant Examiner—Andrew Griffis

[57] ABSTRACT

A method of forming a carbothermally reduced powder of nitrides or carbides is disclosed. The product powder consists principally of unagglomerated particles and is formed by providing a collection of precursor particles in colloidal dispersion, adding to the dispersion a polymerizable monomer, polymerizing the monomer to matrix the precursor particles in discrete, well dispersed positions and carbothermally reducing the particles followed by removing excess carbon by burning. The polymer matrix acts an an agglomerate-inhibiting carbon source during carbothermal reduction.

14 Claims, 12 Drawing Sheets

——— = 1 MICRON

FIG. 1

— = 0.5 MICRON

——— = 0.649 MICRON

———— = 1 MICRON

FIG. 6

— = 0.05 MICRON

FIG. 7

— = 0.05 MICRON

FIG. 8

———— = 1 MICRON

FIG. 9

— = 0.05 MICRON

FIG. 10

— = 0.05 MICRON

FIG. 11

— = 0.5 MICRON

FIG. 12

CARBOTHERMALLY REDUCED CERAMIC MATERIALS AND METHOD OF MAKING SAME

CROSS REFERENCE

This application is a continuation-in-part of co-pending application Ser. No. 105,145 filed Oct. 5, 1987, now abandoned; the disclosure of which application is hereby incorporated by reference.

TECHNICAL FIELD

The present invention relates generally to carbothermally reduced ceramic materials such as Aluminum Nitride or Silicon Carbide formed from the corresponding oxide in the presence of carbon.

BACKGROUND ART

It is often desirable to have ceramic powders of high quality suitable for firing into formed articles which contain little or no impurities and are of a predetermined particle size, whether monosized or of a particular size distribution. Preferably, such powders are substantially free of agglomerates. Such powders, for example aluminum nitride, are useable as electronic substrates upon forming and sintering. Preparation of substantially pure ceramic powders is difficult, to say the least, and has been the subject matter of much experimentation.

U.S. Pat. No. 4,618,592 to Kuramato et al. discloses several methods of preparing aluminum nitride powder. One method, known as direct nitriding, includes nitriding metallic aluminum powder at high temperatures in an atmosphere of nitrogen or ammonia and pulverizing the resulting nitride. Since metallic aluminum is used as a starting material, it naturally requires a step of pulverizing metallic aluminum at some point in order to achieve a reasonable rate of nitridation. In addition, in order to improve sinterability of the resulting nitrides produced by direct nitriding, the nitrides typically require further pulverizing, which may introduce impurities into the material, e.g. during ball-milling oxidation may take place, as well as contamination by way of degradation of the mechanical apparatus. Finally, with respect to direct nitriding, there is inherent in the process several percent by weight of residual aluminum metal which is undesirable.

Another conventional method of producing aluminum nitride is to mix dry powders of alumina and carbon and carbothermally reduce the alumina. Here again, pulverizing is generally required at several points in the process and purity is typically a problem.

Figure 1:
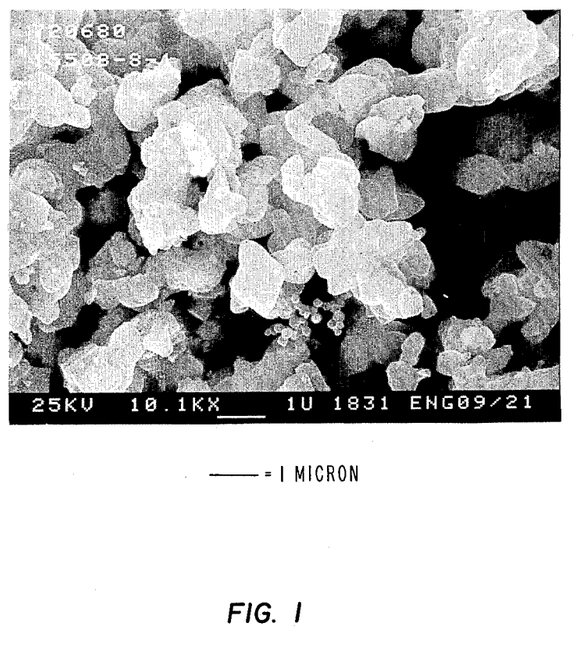
FIG. 1 is a scanning electron micrograph (10,000 X), wherein a one micron dimension is illustrated, of an aluminum nitride powder produced in accordance with a method disclosed in U.S. Pat. No. 4,618,592.

A third known method of producing aluminum nitride includes wet mixing powders of alumina and carbon in a liquid dispersing medium, carbothermally reducing the alumina in the mixture, followed by heating in air or other oxidizing atmosphere to remove unreacted carbon. The resulting nitride powder is generally superior to the product of the above-mentioned processes, however, there are still relatively high levels of agglomerates and impurities. FIG. 1 is a photomicrograph of a powder produced in accordance with this latter process, which is described in the '592 patent referred to hereinabove, and further described in Example 1 hereof.

It is accordingly an object of the invention to produce fine powders from oxidized precursors by reducing them in the presence of carbon to achieve powders with low levels of agglomerates.

It is a further object of the invention to produce powders from their corresponding oxides by carbothermal reduction with a minimum of impurities.

Another object of the invention is to produce powders of controlled particle size which may be altered or changed through selection of appropriate precursor particles.

Another object of the invention is to produce powders which are substantially free of aggregates, or which contain only loosely agglomerated primary particles which are easily separated or dispersed with further processing.

Still further objects and advantages of the present invention will become readily apparent upon consideration of the following description, figures and claims.

SUMMARY OF INVENTION

In accordance with the invention there is provided carbothermally reduced powders consisting of nitrides or carbides of the corresponding oxidized precursor powders. The reduced powders are formed by dispersing precursor particles in a colloidal suspension, adding to the dispersed suspension of particles a polymerizable monomer consisting substantially of carbon atoms, polymerizing the monomer to entrap or matrix the precursor particles in well dispersed discrete positions throughout the polymerized mass, and utilizing the polymer so formed as a carbon source for carbothermal reduction of the precursor particles. The polymer matrix is operative to limit the agglomeration of particles during the reduction process, as will become readily apparent from the discussion which follows hereinafter. After reduction, excess polymer is removed by burning in an oxygen atmosphere. Preferred precursor particles include alumina and silica but may also include other oxidized forms of these elements or oxides of titanium, zirconium, hafnium, vanadium, niobium, tantalum, chromium, molybdenum, tungsten, zinc, cadmium, or boron.

It is desirable that the monomer be soluble in the colloidal dispersion medium, and that polymerization conditions be compatible with maintenance of a stable colloid. Thus, for a colloidal starting material which is stable in aqueous acid, as for example colloidal alumina, a monomer which is soluble and can be polymerized in aqueous acid is preferred, for example furfural alcohol. Since furfural alcohol polymerization is catalyzed by acid, this system obviates the need for an added polymerization catalyst.

Precursor particles useful in accordance with the present invention may range in size from about 1 nanometer (nm) to 5000 nm in diameter, depending on the particle size desired in the final product. Typically, it is preferable to utilize a monomer which forms a thermosetting resin in accordance with the process of the present invention since these resins have a higher temperature resistance than most thermoplastic resins in terms of their structural rigidity, so that the polymer matrix will maintain the precursor particles in dispersed fashion during a reduction process. Preferred monomers include furfural alcohol, furaldehyde, and/or phenol in combination with formaldehyde and/or other aldehydes, or polyfunctonal monomers useful for forming thermosetting resins, but may also include precursors to thermosplastic acetal resins, polyester resins, polyurethane resins, thermoplastic polyphenylene resins, thermoplastic polyether resins, or generally other phenolic, aliphatic, or olefinic monomers suitable for such purposes.

Further variations and advantages of the present invention will become readily apparent from consideration of the following figures, description and examples.

BRIEF DESCRIPTION OF FIGURES

The present invention is described in detail in connection with the examples and the attached figures in which:

FIG. 11 is a scanning transmission electron micrograph of silicon carbide particles in a carbon matrix (100,000 X) wherein a 0.05 micron dimension is illustrated.

DETAILED DESCRIPTION

The present invention makes it possible to synthesize carbide or nitride powders from corresponding oxides by way of carbothermal reduction without the addition of powdered carbon, graphite or other particulate forms as a carbon source.

Generally speaking, this route utilizes carbothermal reduction of the corresponding oxide disposed at discrete positions within an entrapping polymer matrix in a nitrogen or inert atmosphere, depending upon whether one wishes to synthesize nitride or carbide from the precursor particles. If, for example, one wishes to synthesize aluminum nitride the following reaction is carried out in a nitrogen atmosphere:

$$Al_2O_3 + 3C + N_2 \rightarrow 2AlN + 3CO$$

Commercially preferred powders with particles smaller than one micron can be made using alumina in accordance with the invention. Following dispersion of the precursor alumina, polymerization of the monomer, milling of the polymer/powder body and carbothermal reduction at high temperatures typically 1400° to 1700° C. (degrees centergrade), excess carbon can be removed from the product powder by combustion at lower temperatures, typically 600° to 900° C. Precursor particles may be selected to produce the size desired in the final product, provided that a colloidal suspension or sol can be achieved which is at least pseudo-stable, that is, will maintain the precursor particles in dispersed positions at least until they are fixed into position by polymer; in other words, the system should be stable enough to avoid gellation or flocculation in the fabrication process so that agglomerates in the final product are minimized. Such stabilization may be achieved electrostatically, as in example II by adding an acid to a suitable colloidal system or, alternatively such stabilization could be achieved through steric means as is well known in the art. Generally precursor particles should be in the size range of from about one (1) to about five thousand (5,000) nanometers in diameter, typically from about twenty (20) to about two thousand (2,000) nanometers and preferably from about fifty (50) to about one thousand (1,000) nanometers. In the case of aluminum nitride, a preferred particle size is in the range of about 100 nanometers in diameter. Depending upon the various parameters, such as particle size, polymer selected, temperature and atmosphere, in some systems particles may undergo limited aggregation after they are matrixed in discrete positions.

The invention is better understood upon consideration of the following examples which are illustrative of the present invention.

EXAMPLE 1 (COMPARATIVE EXAMPLE)

Aluminum Nitride was prepared following Example 1 from U.S. Pat. No. 4,618,592 to Kuramato et al.

20.0 g of Alcoa A-16 calcined alumina (8.8 m²/g SA, 460 nm mean particle size) was combined with 10.0 g Cancarb N-990 carbon black (carbon 99.5% min., 99.8% LOI, 8.5 m²/g SA, ash 0.2% max, 270 nm mean particle diameter) in 150 ml of ethanol and ball milled one day. The alcohol was evaporated on a hot plate followed by oven drying for 3 h. at 100° C., and the residue was stored in a desiccator until used. 8.06 g of the reactant was placed in a graphite crucible in a controlled atmosphere tube furnace, and the tube was flushed for 1 h. with 50 cc/min. $N_2$. The reaction was carried out at 1,601° C. under flowing nitrogen for 6 h. Following the reaction, 4.65 of black powder was collected. Excess carbon was removed from the product by heating 3.97 grams in the tube furnace under 200 cc/min dry air at 744° C. for 4 h. Light grey product, 3.84 g., was collected and identified as aluminum nitride by X-ray diffraction and chemical analysis (32.2% $N_2$, 1.49% $O_2$ and 0.57% C).

The powder thus produced is shown in FIG. 1. As may be seen from the micrograph of FIG. 1, the aluminum nitride powder formed is replete with agglomerates. In this respect the necking of primary particles is readily apparent from the figure.

The examples which follow provide better quality in terms of separately identifiable particles. Synthesis in accordance with the invention is achieved by trapping oxide particles which are disposed in a stable or pseudo stable colloid or sol within a polymer matrix formed by the in situ polymerization of a carbon containing monomer. The reactants are then heated in a furnace in, for example, a nitrogen atmosphere which first pyrolyzes the resin to carbon and then causes carbothermal reduction. The matrix serves to limit agglomeration and growth of entrapped particles during reduction.

A significant advantage of the present invention is that the colloidal particle size can be controlled in order to control the product particle size and properties. For example, alumina colloids and dispersible alumina powders are commercially available with average particle sizes ranging from two (2) nanometers to hundreds of nanometers.

Utilizing a matrixing polymer in accordance with the invention prevents or limits agglomeration as shown above in connection with Example I during reduction. This may be due, in the case of furfural alcohol, to crosslinking during in situ polymerization of the resin. In any event, it is important to use a resin which is operative as a precursor-particle immobilizing agent so that the particle agglomeration is limited. Further aspects and advantages of the invention will become apparent from the examples following hereinafter.

EXAMPLE II (ALUMINUM NITRIDE)

Part (a) Matrixing 15 g. of Condea Chemie Plural-SB alumina powder was dispersed in 90 ml. deionized water containing 1.0 ml. concentrated nitric acid, which is active in the system described in this example both as a dispersing agent and a polymerization catalyst. The alumina used is substantially pure pseudo-boehmite ($\alpha$-alumina monohydrate) having an average particle size of about fifty (50) microns before dispersion. The mixture was placed in an ultrasonic bath for 8 minutes to form a translucent, at least pseudo-stable sol with no visible particles. This mixture may be centrifuged if so desired.

15 ml. of furfural alcohol was added. The sol turned yellow and then to a yellow green within 30 s. A slight, fine precipitate formed within 20 minutes (a later experiment showed that this precipitate is formed in a control reaction with no alumina added, therefore it is formed only from the alcohol). The reaction mixture was placed in the oven at 105° C.

The sample was removed from the oven after three days. It had become a black, solid resin which resembled coal in appearance, forming a rigid shaped body. 23.54 g. was collected. The product was ground in a Spex mill in two portions for 5 minutes each using a steel jar and balls. Elemental analysis of the powder showed loss on ignition LOI=59.2%; C=32.9,33.1%; H=3.61, 3.61%; N=0.80, 0.79%. By assuming that % $Al_2O_3$=100 -% LOI, the mole ratio of C to $Al_2O_3$ is calculated to be 6.88. The minimum amount of carbon required for complete stoichiometric reduction is three carbons per alumina molecule or a molar ratio of 3. Unless otherwise indicated, all references to % or % by weight throughout this document means percent by weight of the total composition.

Part (b) Carbothermal Reduction 15.62 g. of powder produced as above was placed in a graphite tray which was set into an alumina tube in a furnace. The tube was purged with nitrogen and the reduction was carried out at 1575° C. for 6 h. The product was a black powder.

X-ray diffraction of this product showed that aluminum nitride and graphite were the only crystalline phases present. Elemental analysis showed the incorporation of nitrogen into the product and the presence of excess carbon: C=7.95; H=0.03, N=29.6.

Figure 2:
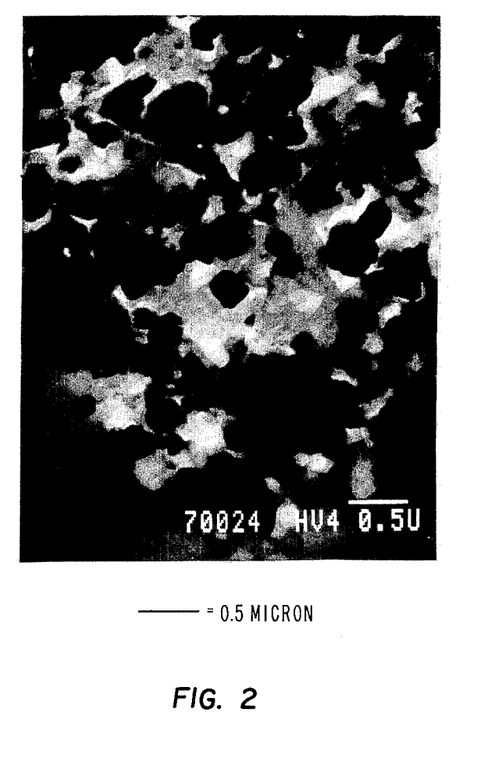
FIG. 2 is a scanning transmission electron micrograph (TEM) of fine aluminum nitride particles dispersed in a pyrolyzed polyfurfural alcohol matrix (20,000 X) wherein a 0.5 micron dimension is illustrated.
Figure 2:
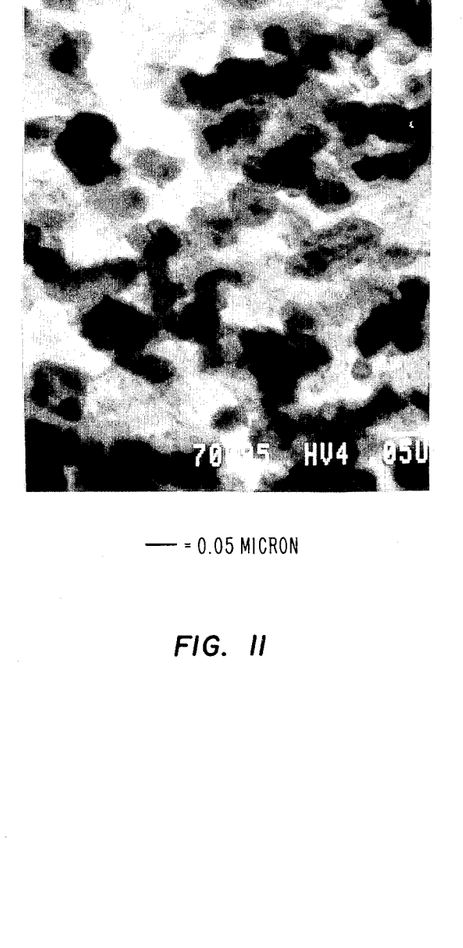

Scanning transmission electron microscopy revealed the presence of isolated aluminum nitride particles of about 0.1 to 0.3 micros in diameter in a carbon matrix. This can be seen in FIG. 2.

Part (c) Carbon Removal 5.25 g. of the product was placed in an alumina tray in the tube furnace, the tube was purged with dry air (250 cc/min for 45 min.), and the product was heated in flowing air to 693° C. for 4 h. 4.68 g of light grey product powder was collected.

Figure 3:
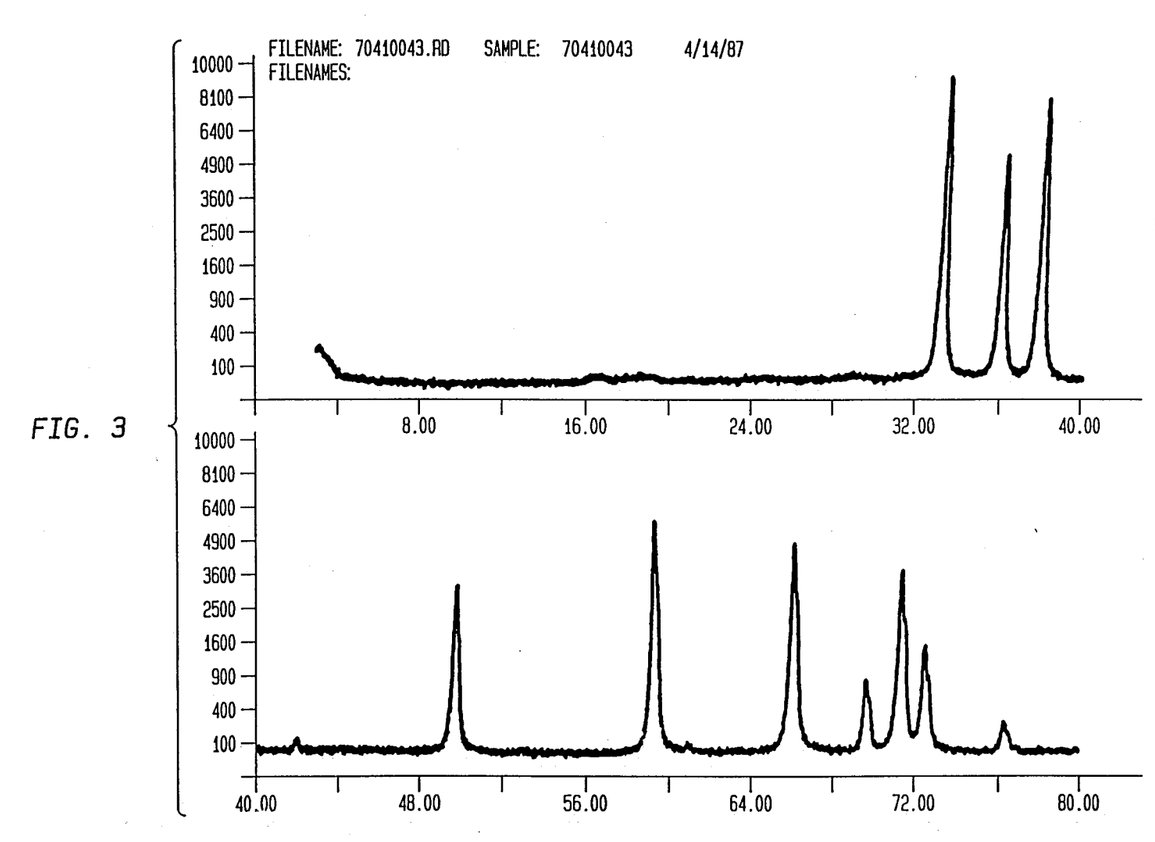
FIG. 3 is an X-ray diffraction pattern of aluminum nitride powder produced by the method of this invention (intensity vs. $2\theta$)

X-Ray diffraction showed that the material only contains hexagonal aluminum nitride. The diffraction pattern is shown in FIG. 3. Elemental analyses are shown below in Table I. The surface area was 5.4 $m^2/g$, for which the calculated equivalent spherical diameter is 340 nm.

TABLE I

| Elemental Analysis vs. Calculated Content for Aluminum Nitride | | |
|---|---|---|
| | Example I (%) | Calculated % |
| Al | 65.7 | 65.8 |
| C | 0.40 | 0 |
| H | 0.00 | 0 |
| N | 32.6 | 34.2 |

Figure 4:
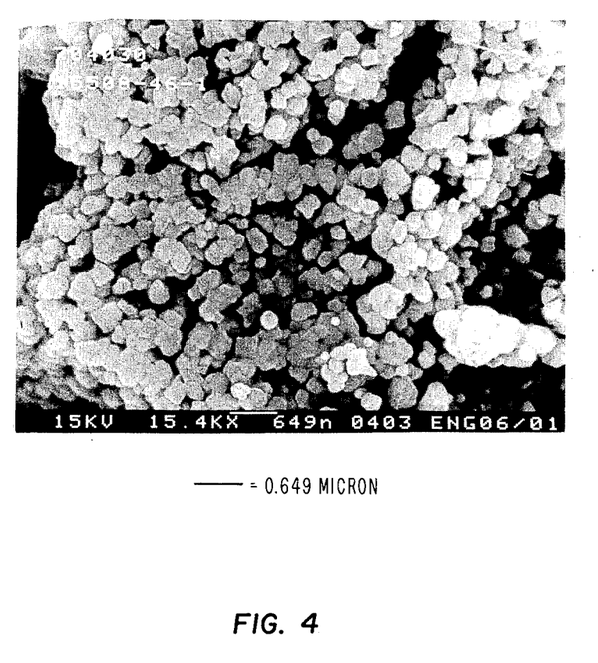
FIG. 4 is a scanning electron micrograph of aluminum nitride powder prepared according to the method of this invention, after removing excess carbon at 693° Centigrade (15,000 X), wherein a 0.649 micron dimension is shown.

Scanning electron microscopy showed that the product after being burned clean of carbon at 693° C. contained both loosely aggregated fine particles, in the 0.1 to 0.3 micron size range, and areas where the aluminum nitride appears more strongly aggregated. An SEM of this material is shown in FIG. 4.

Figure 5:
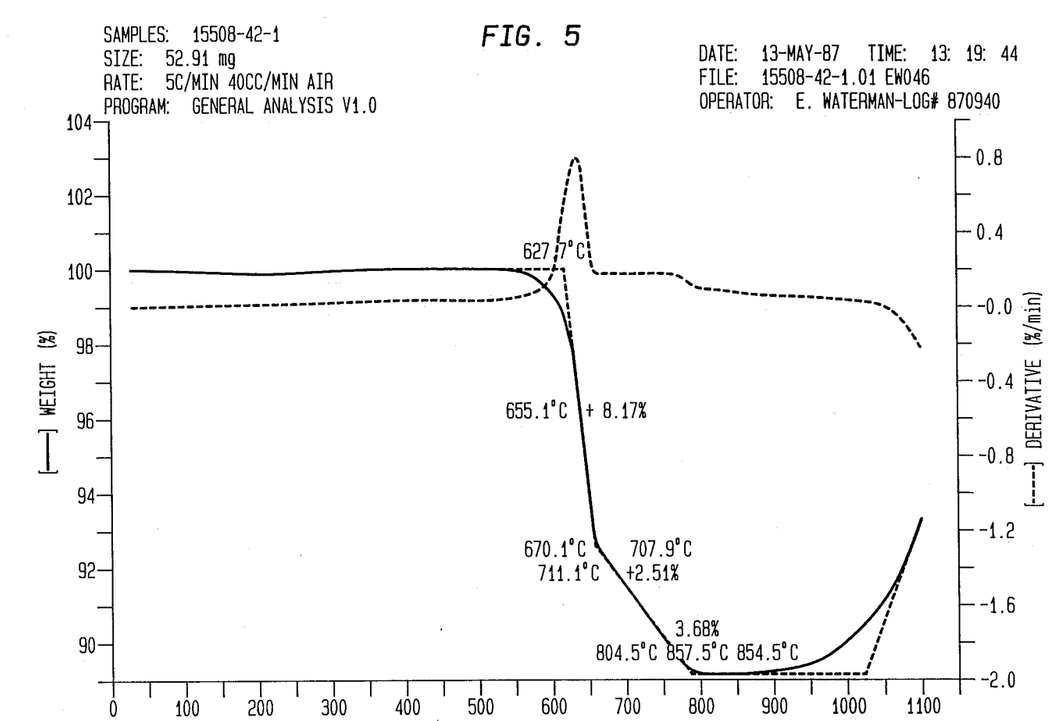
FIG. 5 is a thermogravimetric analysis of aluminum nitride in pyrolyzed polyfurfural alcohol prepared according to the method of this invention.
Figure 6:
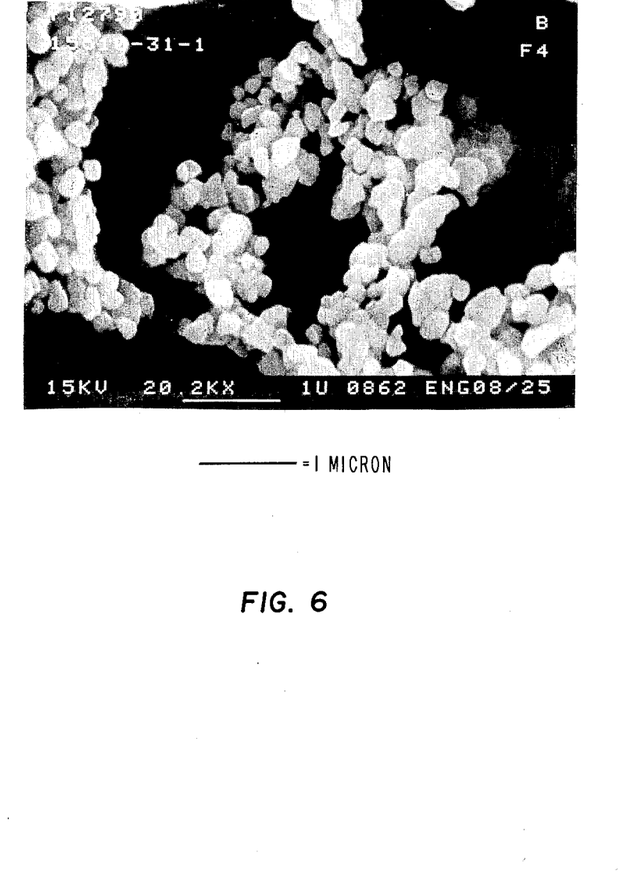
FIG. 6 is a scanning electron micrograph of aluminum nitride prepared according to the method of this invention, after removing pyrolyzed polyfurfural alcohol at 625° C. (20,000 X) showing a 1 micron dimension in its legend.

Thermogravimetric analysis was used to characterize carbon removal. FIG. 5 shows the thermogravimetric analysis for a sample of aluminum nitride plus excess carbon prepared similarly to the sample of this example 2. It shows that carbon burn off begins near 600° C. (the weight gain near 1100° C. corresponds to oxidation of the AlN). Carbon was then removed from the sample using milder conditions, 25% air in He at 625° C. for 17.5 h. The almumina nitride produced contained fine particles substantially free of agglomerates (that is, free of necked structures) as shown in the scanning electron micrograph of FIG. 6.

EXAMPLE III (SILICON CARBIDE)

Figure 7:
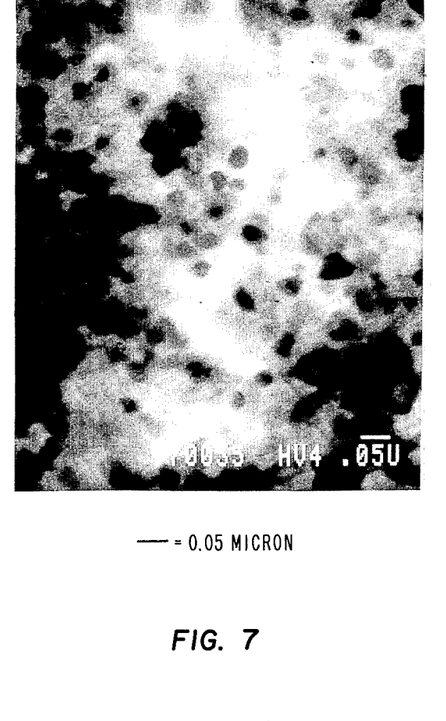
FIG. 7 is a scanning transmission electron micrograph of silicon oxide particles entrapped in a polyfurfural alcohol matrix (100,000 X) wherein a 0.05 micron dimension is illustrated.

20.0 g of Nyacol DP-4500 Colloidal Silica, which contains 47.1% $SiO_2$ as 100 nm particles dispersed in ethylene glycol based on manufacturer's information, was added to 80.0 ml of furfural alcohol with stirring in an ultrasonic bath. The colloid did not gel or flock upon dilution. 1.0 g of trichloroacetic acid was dissolved in the colloidal dispersion. The reaction was then heated slowly to 100° C. and left at 100° C. overnight. The mixture, which was a viscous brown liquid at the top and more rubbery at the bottom and sides of the beaker, was transferred to a 200° C. oven where it solidified. It was broken into chunks with a spatula and returned to the oven overnight. The solid product was collected and ground for 30 min. in a steel jar using the Spex mill to produce a brown powder. Scanning transmission electron microscopy reveals silica particles matrixed in polyfurfural alcohol as shown in FIG. 7. They appear to be in the 30 to 100 nm diameter size range.

Figure 8:
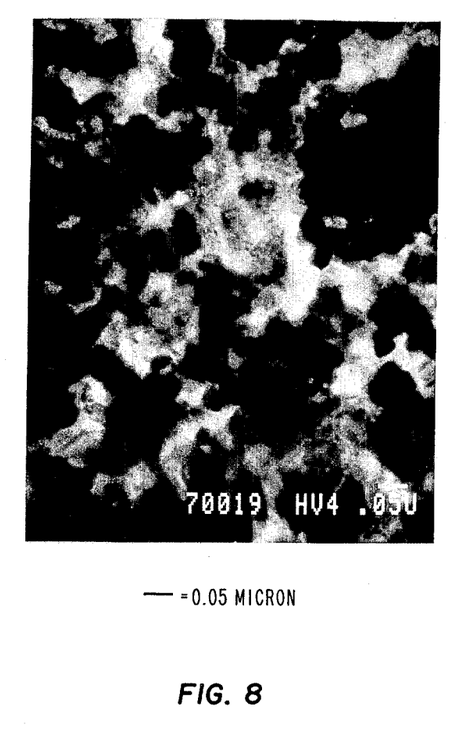
FIG. 8 is a scanning transmission electron micrograph of silicon carbide particles in a carbon matrix (100,000 X) wherein a 0.05 micron dimension is illustrated.

17.0 g of the powder was placed in an alumina crucible in the tube furnace, and the alumina tube was evacuated and back filled with argon three times. The reaction was carried out under flowing argon at 1570° C. for 6 h. 6.0 g of black powder product was collected. CHN analysis of the black powder yielded 74.2, 0.01, 0.33. The LOI was 66.0%. X-ray diffraction showed that silicon carbide was the major crystalline phase, with smaller peaks (less than 10% of the major peak intensity) which were not identified. TEM of the reduced powder shows dark SiC particles, 30-100 nm in diameter, in a lighter polyfurfural alcohol matrix as shown in FIG. 8. Thus, for the 100 nm starting colloidal silica, the particle size is apparently maintained during reduction.

Figure 9:
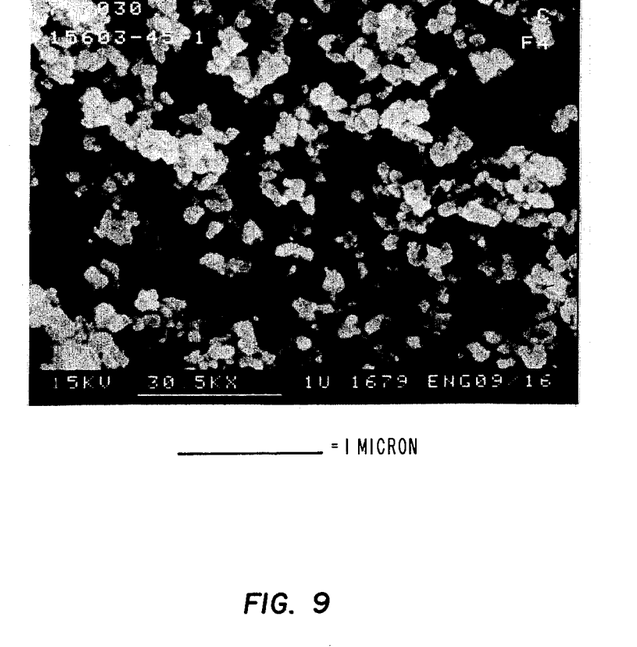
FIG. 9 is a scanning electron micrograph of silicon carbide prepared according to the method of this invention, after removing polyfurfural alcohol at 625° C. (30,000 X) wherein a 1 micron dimension is illustrated.

Excess carbon was removed from the sample by heating in dry air at 625° C. for 6 h. The product was very light grey. X-ray diffraction showed that silicon carbide was the only crystalline phase. SEM showed that the product consisted largely of 100 nm primary particles which appeared loosely aggregated, as shown in FIG. 9. The surface area by nitrogen adsorption was 26 m²/g, corresponding to a calculated equivalent spherical diameter of 72 nm.

EXAMPLE IV (SILICON CARBIDE)

Figure 10:
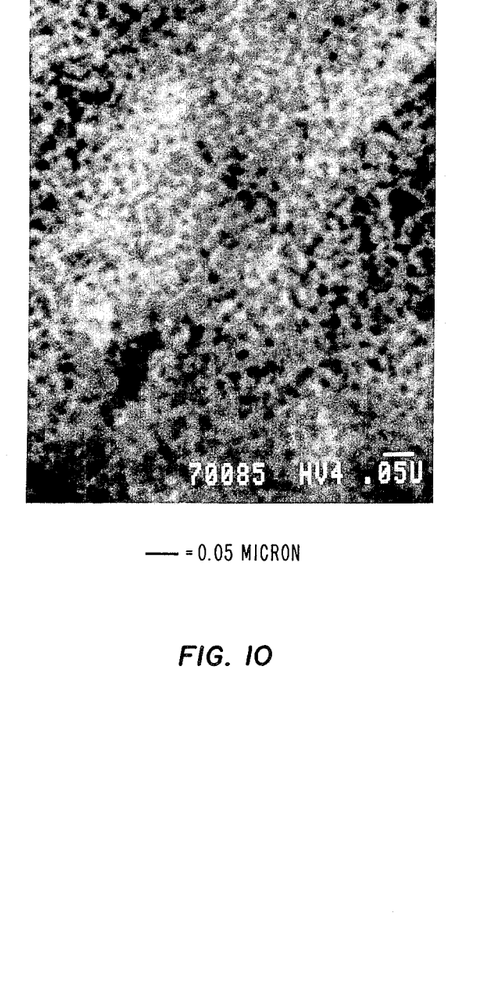
FIG. 10 is a scanning transmission electron micrograph of silicon oxide particles entrapped in a polyfurfural alcohol matrix (100,000 X) wherein a 0.05 micron dimension is illustrated.

30.8 g of Nyacol DP-4440 Colloidal Silica, which contains 34.5% $SiO_2$ as 20 nm particles dispersed in ethylene glycol based on manufacturer's information, was added with stirring to 80 ml of furfural alcohol. 0.2 g of tricholoracetic acid was added and the reaction was heated to 107° C. for four days followed by heating to 160° C. for one day. The hard black product was ground in a Spex mill to produce powder. Scanning transmission microscopy of this material showed silica particles largely in the 10 to 20 nm diameter size range entrapped in a polyfurfural alcohol matrix. This is shown in FIG. 10.

A portion of this reactant was carbothermally reduced in a tube furnace under argon as in Example III. X-ray diffraction on the product showed that the product contained silicon carbide as the only crystalline phase. Transmission electron microscopy showed that the silicon carbide particles entrapped in carbon which appear to be in the 50 to 100 nm size range, as shown in FIG. 11. Thus, when 20 nm silica particles were used, larger particles were formed during the reduction process. This is in contrast to Example III, where particle size was maintained for the larger 100 nm starting material during reduction.

Figure 12:
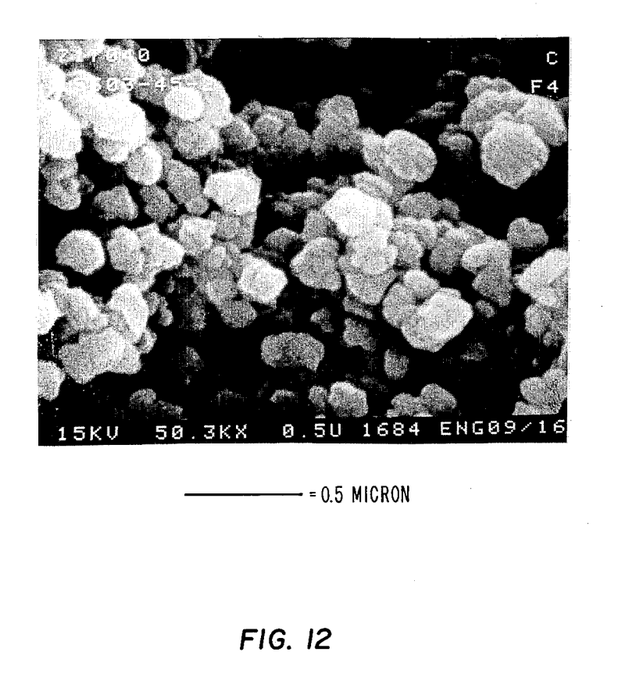
FIG. 12 is a scanning electron micrograph of silicon carbide prepared according to the method of this invention, after removing carbon at 625° C. (50,300 X) wherein a 0.5 micron dimension is illustrated.

Oxidizable carbon was removed from this sample in a tube furnace, as in Example III. The product was silicon carbide by X-ray diffraction. Elemental analysis found that the product was 61.6% Si, 25.0 % C, and 7.34 % Oxygen. FIG. 12 shows a scanning electron micrograph of the product after removal of excess carbon.

As will be appreciated by those of skill in the art, various other carbothermally reduced compounds such as silicon nitride or silicon carbonitride, may be produced in accordance with the above, and that optimizing the production of compounds so formed may involve selection of the correct colloid, polymer system, stabilizing agent and reducing conditions. So also, one of such skill will readily appreciate that colloids useful for the present invention may be formed by condensation rather then dispersion, for example, the formation of a silica sol by hydrolysis of tetraethoxysilane or like compounds. The procedures illustrated above may thus further be used to form carbides, nitrides, carbonitrides, oxynitrides, oxycarbides, combinations thereof and the like of titanium, zirconium, hafnium, vanadium, niobium, tantalum, chromium, molybdenum, tungsten, zinc cadmium, boron or like elements.

Instead of adding monomer to a solution, one could add a soluble polymer to a colloidal suspension and entrap particles by crosslinking the polymer, for example by adding diglycidyl ether to a suitable polymer system.

The invention has been described in detail above both generally and through examples such that further explanation to enable one of ordinary skill in the art to fully appreciate and practice the invention is deemed unnecessary. The foregoing examples in no way restrict or define the present invention which is limited only by the appended claims.

I claim:

1. A method of forming a carbothermally reduced powder of nitrides of carbides formed from metal oxide precursor particles dispersed in suspension comprising the steps of dispersing a collection of colloidal precursor particles in a dispersion medium to form a colloidal suspension, adding to the mixture a polymerizable monomer comprising carbon atoms, polymerizing said monomer to matrix the precursor particles in well dispersed discrete positions throughout the polymerized mass wherein the polymer so formed is capable of acting as a carbon source suitable for carbothermal reduction of the precursor particles, and carbothermally reducing said particles to form at least one of carbide or nitride product particles within said polymerized mass, aid polymer matrix being operative to limit the agglomeration of said precursor particles during reduction.

2. The method according to claim 1, further comprising the step of burning said polymer from said polymerized mass in an oxidizing atmosphere to yield a powder substantially free of said polymer.

3. The method according to claim 2, wherein said metal oxide precursor particles comprise alumina.

4. The method according to claim 3, wherein said dispersion medium comprises nitric acid and said polymerizable monomer comprises furfural alcohol.

5. The method according to claim 4 wherein said polymerized mass is carbothermally reduced in an atmosphere consisting essentially of nitrogen or ammonia and said product particles are aluminum nitride particles.

6. The method according to claim 1, wherein said precursor particles are of a size from about 50 to about 1000 nanometers in diameter.

7. The method according to claim 1 wherein said polymerizable monomer forms a thermosetting resin.

8. The method according to claim 1, wherein said metal oxide precursor particles are selected from the group consisting of alumina or silica and said product particles are selected from the group consisting of aluminum nitride, silicon nitride or silicon carbide.

9. The method according to claim 8 wherein said dispersion medium is an aqueous acid solution.

10. A method of forming a reduced powder of carbides or nitrides from a colloidal suspension of corresponding metal oxide precursor particles comprising the steps of matrixing said metal oxide precursor particles in a carbon-containing polymerized body such that said metal oxide precursor particles are in distinct positions with respect to each other, said polymerized body being formed by the in situ polymerization of matrix material having precursor particles dispersed therein, which is operative both as a carbon source for carbothermal reduction and for limiting the agglomeration of metal oxide precursor particles, carbothermally reducing said particles, followed by the step of removing the polymer to yield the powder.

11. The method according to claim 10 wherein said metal oxide precursor particles comprise oxides of at least one of titanium, zirconium, hafnium, vanadium, niobium, tantalum, chromium, molybdenum, tungsten, zinc, cadmium, boron, aluminum or silicon.

12. The method according to claim 11, wherein said reduced powder is selected from the group consisting of nitrides, carbides or carbo-nitrides of titanium, zirconium, hafnium, vanadium, niobium, tantalum, chromium, molybdenum, tungsten, zinc, cadmium boron, aluminum or silicon.

13. The method according to claim 10, further comprising the step of adding a dispersing agent to said colloidal suspension.

14. The method according to claim 13, wherein said dispersing agent is further operative to catalyze the in situ polymerization of said matrix material.

* * * * *